United States Patent
Muff et al.

(10) Patent No.: US 9,092,257 B2
(45) Date of Patent: *Jul. 28, 2015

(54) VECTOR EXECUTION UNIT WITH PRENORMALIZATION OF DENORMAL VALUES

(71) Applicant: International Business Machines Corporation, Armonk, NY (US)

(72) Inventors: Adam J. Muff, Issaquah, WA (US); Paul E. Schardt, Rochester, MN (US); Robert A. Shearer, Woodinville, WA (US); Matthew R. Tubbs, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 112 days.

This patent is subject to a terminal disclaimer.

(21) Appl. No.: 13/793,367

(22) Filed: Mar. 11, 2013

(65) Prior Publication Data
US 2014/0164465 A1    Jun. 12, 2014

Related U.S. Application Data

(63) Continuation of application No. 13/707,006, filed on Dec. 6, 2012.

(51) Int. Cl.
*G06F 15/80* (2006.01)
*G06F 5/01* (2006.01)
*G06F 7/499* (2006.01)
*G06F 7/483* (2006.01)

(52) U.S. Cl.
CPC .............. *G06F 7/483* (2013.01); *G06F 5/012* (2013.01); *G06F 7/49936* (2013.01); *G06F 15/8053* (2013.01)

(58) Field of Classification Search
USPC ......... 708/205, 496, 498, 501, 520, 523–524, 708/603, 607, 626; 712/2–9, 16, 21–22, 24
See application file for complete search history.

(56) References Cited

U.S. PATENT DOCUMENTS

| | | | |
|---|---|---|---|
| 5,423,051 A * | 6/1995 | Fuller et al. ...................... 712/7 |
| 5,668,984 A * | 9/1997 | Taborn et al. ................. 712/222 |
| 5,963,461 A | 10/1999 | Gorshtein et al. | |
| 6,732,134 B1 | 5/2004 | Rosenberg et al. | |
| 6,801,924 B1 | 10/2004 | Green et al. | |
| 8,103,858 B2 * | 1/2012 | Sperber et al. ................ 712/222 |

(Continued)

OTHER PUBLICATIONS

E. M. Schwarz, M. Schmookler, and S. D. Trong, "FPU Implementations with Denormalized Numbers," IEEE Transactions on Computers vol. 54, No. 7, pp. 825-836, 2005.*

*Primary Examiner* — Chuong D Ngo
*Assistant Examiner* — Matthew Sandifer
(74) *Attorney, Agent, or Firm* — Wood, Herron & Evans, L.L.P.

(57) ABSTRACT

A method, circuit arrangement, and program product for executing instructions including denormal values for one or more operands in a vector execution unit. A denormal value operand may be prenormalized by a first processing lane of the vector execution unit upon detecting the denormal value. The prenormalized value and any other operands of the instruction may be communicated to a dot product adder of the vector execution unit. The dot product adder performs at least a portion of the floating point operation with the prenormalized value and any other operands of the instruction.

11 Claims, 9 Drawing Sheets

(56) References Cited

U.S. PATENT DOCUMENTS

| | | | |
|---|---|---|---|
| 2009/0049113 A1* | 2/2009 | Muff et al. | 708/524 |
| 2009/0063608 A1* | 3/2009 | Mejdrich et al. | 708/520 |
| 2010/0031009 A1* | 2/2010 | Muff et al. | 712/222 |
| 2013/0219149 A1* | 8/2013 | Ellis et al. | 712/32 |

* cited by examiner

| | CYCLE 1 | CYCLE 2 | CYCLE 3 | ... | CYCLE 24 | CYCLE 25 | CYCLE 26 | CYCLE 27 | CYCLE 28 | CYCLE 29 | CYCLE 30 | CYCLE 31 | CYCLE 32 | CYCLE 33 | CYCLE 34 |
|---|---|---|---|---|---|---|---|---|---|---|---|---|---|---|---|
| B | A+B DENORMAL NUMBER IDENTIFIED | | | | UCODE NORMALIZE | | | | | A+B | | | | | |
| | | A+B | | | | UCODE NORMALIZE | | | | | A+B | | | | |
| | | | A+B FLUSH TO UCODE FOR FIXUP | | | | UCODE NORMALIZE | | | | | A+B | | | |
| | | | | | | | | UCODE NORMALIZE | | | | | A+B | | |
| | | | | FLUSH PENALTY 20 CYCLE | | | | | UCODE NORMALIZE | | | | | A+B | |
| | | | | | | | | | | UCODE NORMALIZE | | | | | A+B |

FIG. 7

| N | CYCLE 1 | CYCLE 2 | CYCLE 3 | CYCLE 4 | CYCLE 5 | CYCLE 6 | CYCLE 7 | CYCLE 8 | CYCLE 9 |
|---|---|---|---|---|---|---|---|---|---|
| A+B | A+B DENORMAL NUMBER IDENTIFIED | B PRENORM | | | | | | | |
| | | | B PRENORM | | | | | | |
| | | | | B PRENORM | | | | | |
| | | | | | B PRENORM | | | | |
| | | | | | | DOT A+B | | | |
| | | | | | | | DOT A+B | | |
| | | | | | | | | DOT A+B | |
| | | | | | | | | | DOT A+B |

FIG. 8

VECTOR EXECUTION UNIT WITH PRENORMALIZATION OF DENORMAL VALUES

CROSS-REFERENCE TO RELATED APPLICATIONS

This application is a continuation of U.S. patent application Ser. No. 13/707,006, filed on Dec. 6, 2012 by Adam J. Muff et al., the entire disclosure of which is incorporated by reference herein.

FIELD OF THE INVENTION

The invention is generally related to data processing, and in particular to processor architectures.

BACKGROUND

In computing systems that execute floating point math instructions, a floating value that may be represented in binary includes a sign bit, a set of exponent bits and a set of significand bits. In general, floating point values are presumed to have a value of '1' for the most significant bit of the significand and the exponent bits are adjusted accordingly, which provides the greatest precision for all of the significand bits. However, when a floating point value is so small that the set of bits of the exponent cannot represent the negative exponent value, leading zeros must be used for one or more of the most significant bits in the set of significand bits. For example, in single precision floating point, the exponent includes a set of eight bits, which may represent a value as small as $2^{-127}$. By using leading zeros in the significand, a value smaller than $2^{-127}$ may be represented by the single precision floating point bit.

Such floating point values having leading zeros in the significand are generally referred to as denormals or denormal values. Since the vast majority of floating point values are normal (i.e., not denormal), floating point pipelines are designed and optimized to handle normal floating point values. Further, due to area and timing constraints of floating point pipelines and execution units in conventional processors, denormal values generally cannot be handled directly in a floating point pipeline, and must be normalized before they can be handled by a floating point pipeline. When a denormal value is an operand of an instruction, conventional processors generally don't detect the denormal value until the instruction has already been decoded and sent to the floating point pipeline. At that point, such processors are required to normalize the denormal value by storing the instruction in a temporary register, flushing the floating point pipeline, executing microcode to normalize the denormal value operand, and re-issuing the instruction from the temporary register after normalization.

Any time a floating point pipeline is flushed, a significant performance penalty results due to the need to restart the instruction as well as any subsequent operations that were in progress when the pipeline was flushed. In addition, executing microcode to normalize a denormal value operand introduces additional performance penalties, such that when a floating point instruction includes a denormal value operand, a performance penalty of twenty or more processing cycles often occurs. Hence, denormal value operands of floating point instructions are generally heavily penalized in conventional processors.

Therefore, a continuing need exists in the art for improved processing of floating point instructions including a denormal value for an operand.

SUMMARY

Embodiments of the invention address these and other problems associated with the prior art by prenormalizing a denormal value of an operand of a floating point instruction in an instruction pipeline with a processing lane in a vector execution unit and performing at least a portion of the floating point operation of the floating point instruction with the prenormalized value in a dot product adder of the vector execution unit. By prenormalizing the denormal value in a vector processing lane and performing at least a portion of the operation of the instruction with a dot product adder connected to the vector processing lane, embodiments of the invention often avoid flushing of the instruction pipeline and in turn avoid processing cycle penalties associated with flushing the instruction pipeline. Moreover, embodiments of the invention typically perform the operation of the instruction in a single pass of an execution pipeline, such that the instruction is not required to be reissued.

Consistent with embodiments of the invention, a floating point instruction including at least one operand that is a denormal value may be executed in a vector execution unit. The denormal value may be prenormalized in a processing lane of the vector execution unit, and at least a portion of a floating point operation corresponding to the floating point instruction may be performed using the prenormalized value in a dot product adder of the vector execution unit.

These and other advantages and features of some embodiments of the invention are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

BRIEF DESCRIPTION OF THE DRAWINGS

FIG. 7 is an example timing diagram of a processor when processing an instruction including a denormal value as an operand in a conventional manner.

FIG. 8 is an example timing diagram of a processor including the vector execution unit of FIG. 5 when processing an instruction including a denormal value as an operand.

Figure 1:
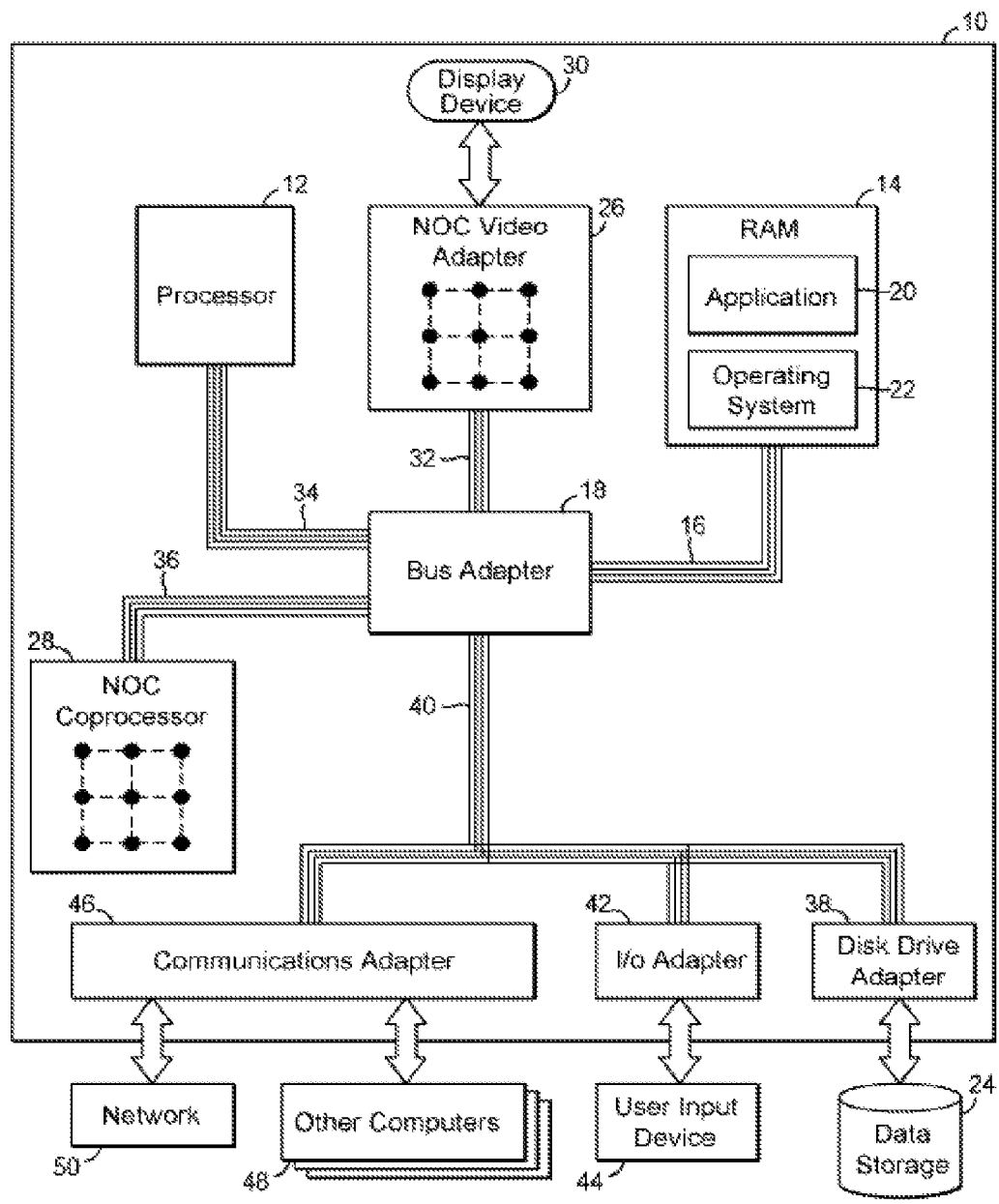
FIG. 1 is a block diagram of exemplary automated computing machinery including an exemplary computer useful in data processing consistent with embodiments of the present invention.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION

Vector execution units generally include vector processing lanes to process multiple data sources (i.e., operands) for each instruction (i.e., SIMD instructions) in an instruction pipeline of the vector execution unit. Each vector processing lane is generally configured to perform a floating point operation on one or more operands of a floating point instruction. Each vector processing lane is connected to a dot product adder, which is generally only utilized to perform a floating point dot product operation on results from each connected vector processing lane. Otherwise, the dot product adder is idle for most other floating point operations.

Consistent with embodiments of the invention, one or more vector processing lanes are configured to prenormalize a denormal value operand of an instruction, and the prenormalized value is communicated to the dot product adder such that at least a portion of the operation of the instruction is performed with the prenormalized value with the dot product adder. In general, a denormal value may be normalized by a vector processing lane by shifting significand bits of such values to the left and decrementing the exponent bits accordingly. Therefore, consistent with certain embodiments of an invention, when a floating point instruction including a denormal value for an operand is loaded into the execution pipeline, the vector processing lane assigned to perform the floating point operation corresponding to the instruction with the denormal value operand instead prenormalizes the denormal value. The remaining operands loaded into the vector processing lane are communicated to the dot product adder from the vector processing lane unprocessed, and the dot product adder is configured to perform the floating point operation of the instruction with the prenormalized value operand and the remaining operands. Thus, in some embodiments, while the floating point operation is effectively deferred from being performed in the processing lane where the operation would have been performed in the absence of any denormal values, the floating point operation is still performed in the same pass through the floating point pipeline (albeit at a later stage), thereby avoiding a pipeline flush and the attendant performance penalty that would otherwise occur.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
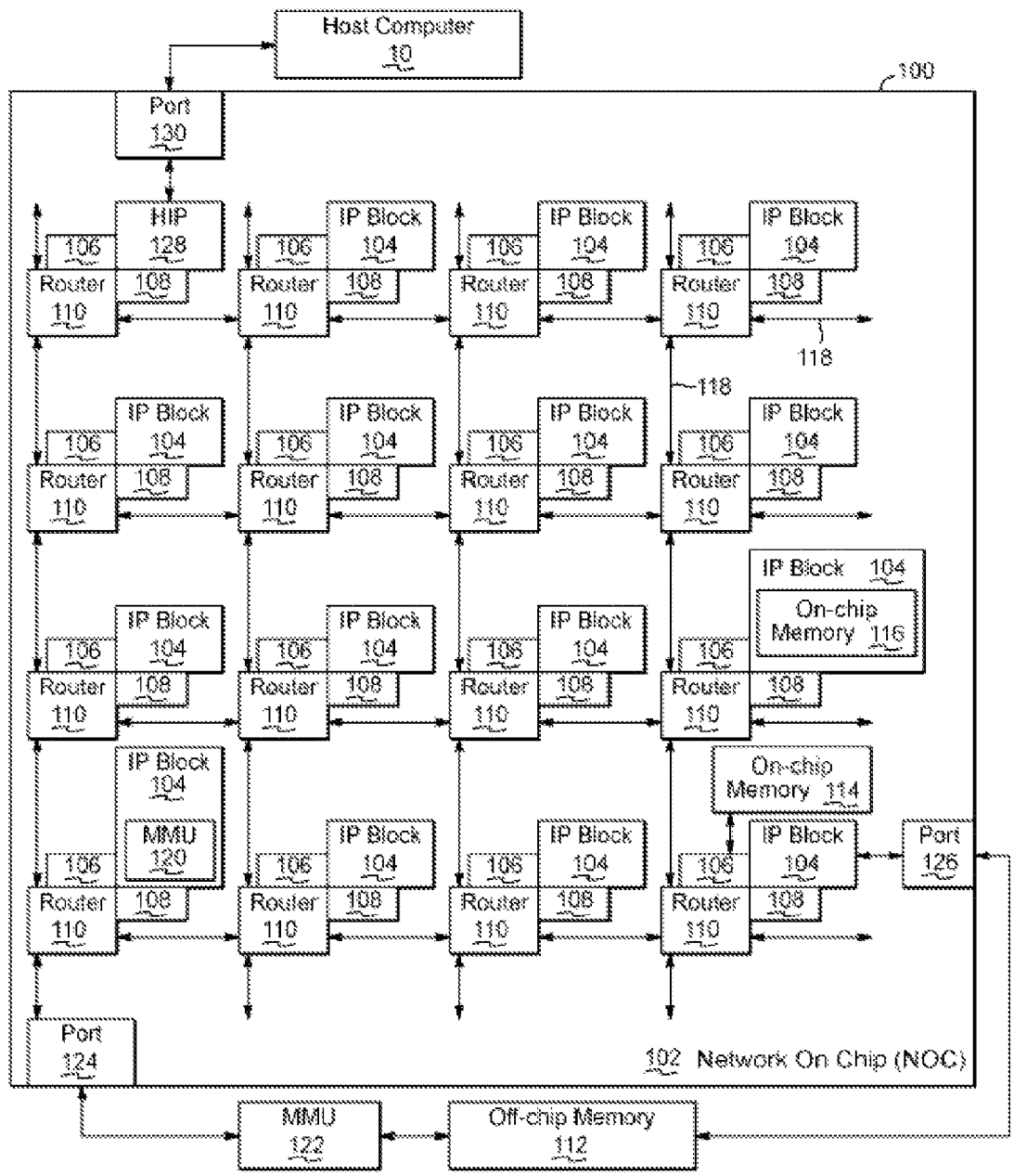
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
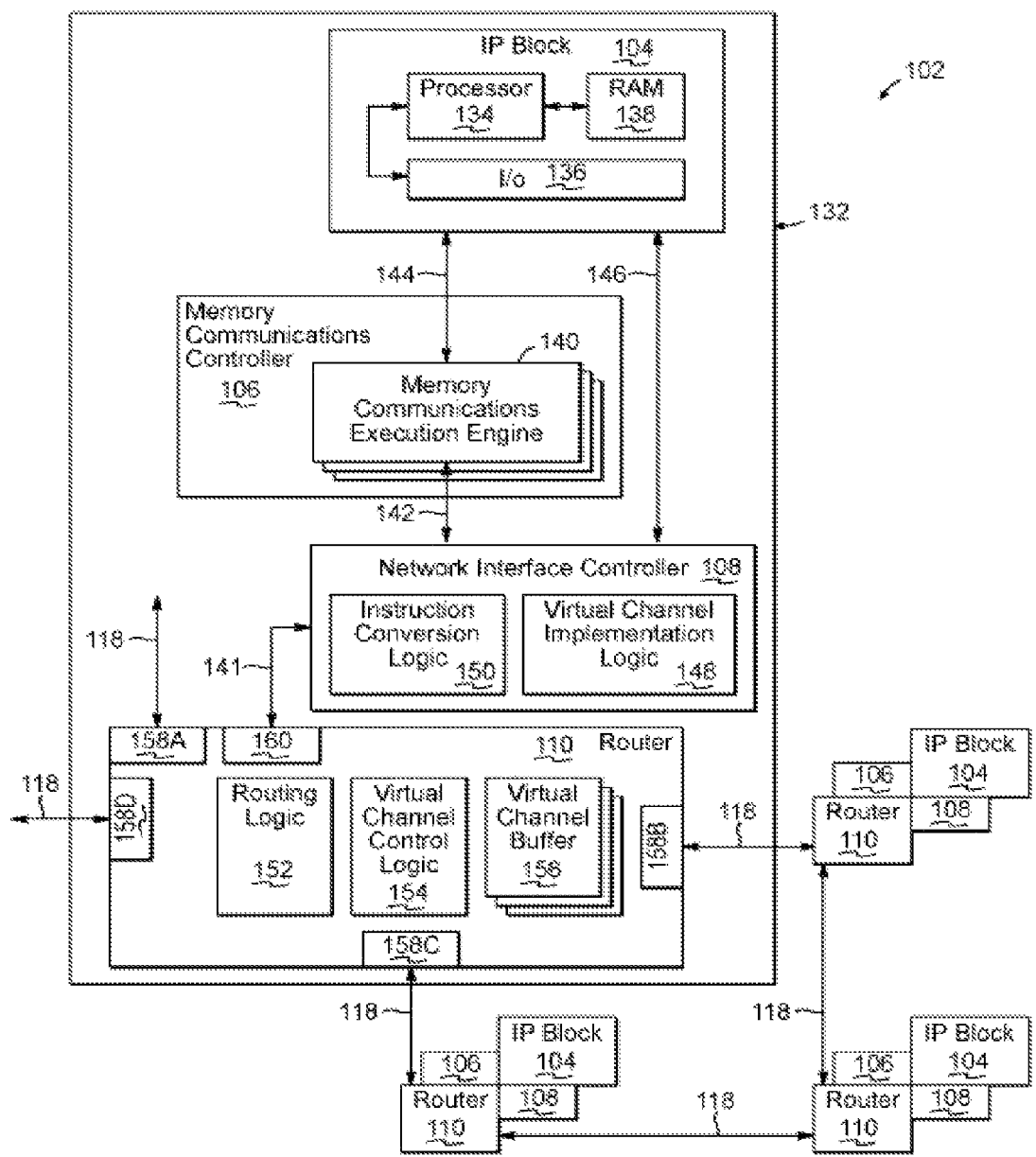
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132 which may be referred to as a node or a hardware thread. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
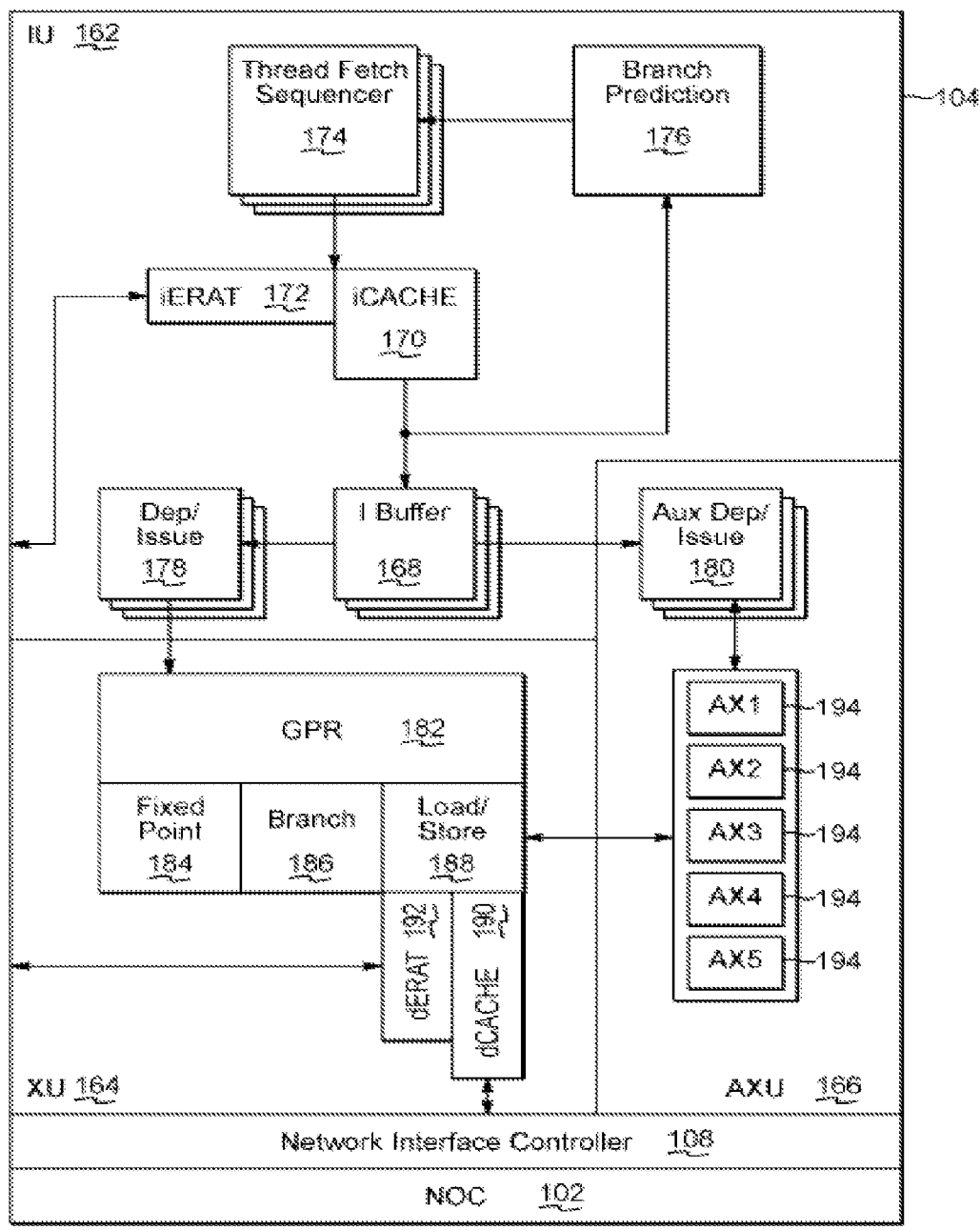
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32*b* or 64*b* PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks. Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Denormal Value Processing with Vector Processing Unit

In embodiments of the invention, an instruction pipeline of a vector execution unit may be monitored to detect instructions in the instruction pipeline that include a denormal value as an operand. Instructions including a denormal value for an operand may be flagged, and prior to executing the instruction, the denormal value may be prenormalized in a vector processing lane, and the operation of the instruction may be performed by a connected dot product adder using the prenormalized value. In such embodiments, other operands loaded into the vector processing lane that are not denormal values bypass the vector processing lane and are communicated directly to the dot product adder. The dot product adder performs the operation of the instruction with the prenormalized value and the other operands. Therefore, embodiments of the invention execute instructions including one or more denormal values for operands without flushing the instruction pipeline by prenormalizing the denormal values with one or more vector processing lanes and passing the other operands unprocessed to a dot product adder for processing with the prenormalized values.

Figure 5:
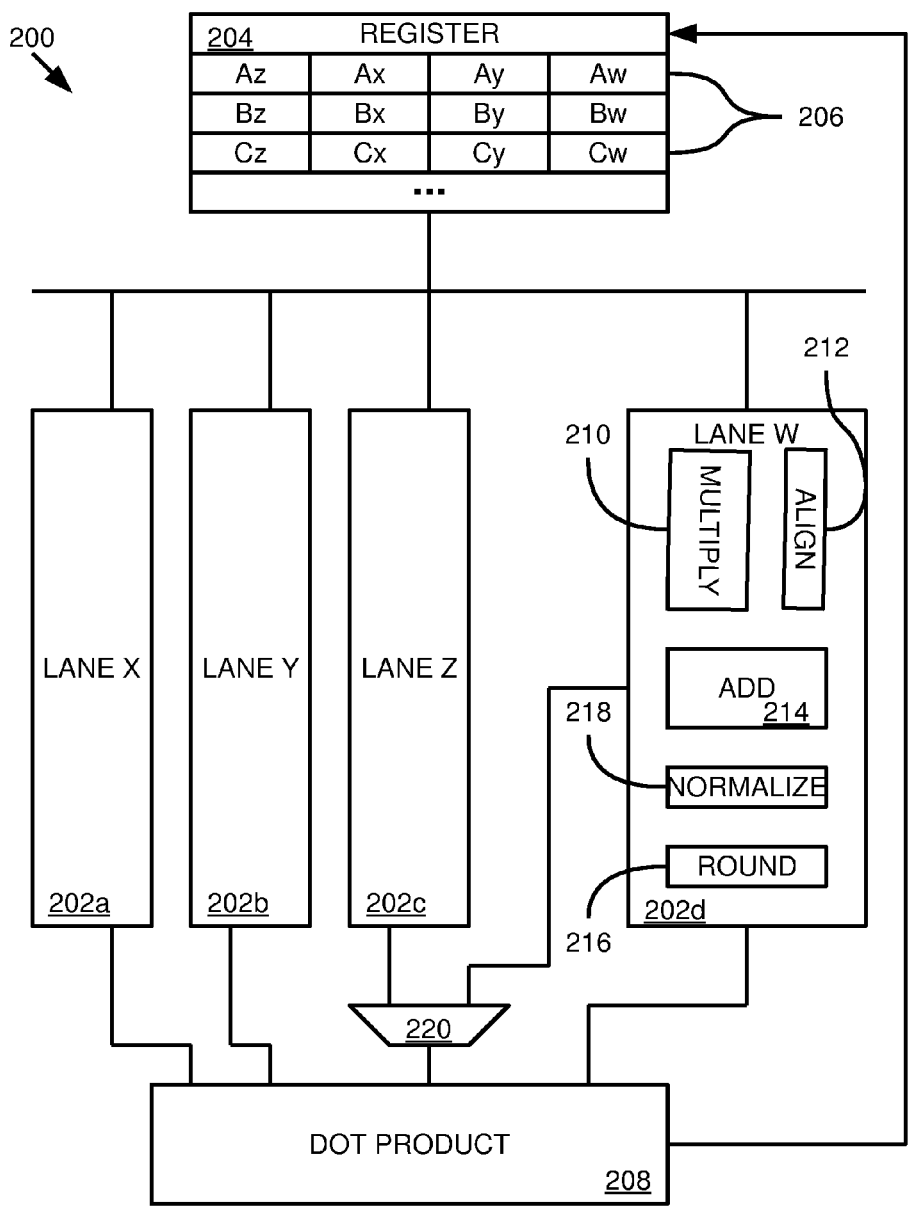
FIG. 5 is a block diagram of a vector execution unit that may be configured in the IP block of FIG. 4 to prenormalize denormal values in a manner consistent with the invention.

Turning now to FIG. 5, this figure provides a block diagram of a vector execution unit 200 consistent with some embodiments of the invention. As shown, the vector execution unit includes vector processing lanes 202a-d connected to a register 204 such that data that may be referenced as operands of instructions 206 may be retrieved from the register 204 for processing and results may be stored in the register 204. Each vector processing lane 202a-d is connected to a dot product adder 208 configured to perform dot product operations to results received from each processing lane 202a-d. As shown, an example vector processing lane (labeled lane W) 208d includes logic configured to perform floating point operations on data referenced as operands for floating point instructions. Such logic is generally configured to perform floating point operations in stages, and such logic includes for example, multiplication logic 210, aligner logic 212, addition logic 214 and rounding logic 216. Moreover, vector processing lane W 208d may be configured with normalization logic 218 configured to normalize a denormal value. In addition, a denormal value may be normalized with the aligner logic 212.

The vector execution unit 200 includes multiplexer logic 220 configured between vector processing lanes 208a-d and the dot product adder 208, such that operands loaded in a vector processing lane 202a-d that do not need to be normalized may be communicated to the dot product adder 208 to thereby bypass processing in the vector processing lane 208a-d. An operand that is communicated through multiplexing logic 220 may be input into an input associated with a different vector processing lane 208a-d, such that the dot product adder 208 may perform a dot product operation using the prenormalized value operand and the operand input at a different vector processing lane 208a-d input.

For example, if a floating point add instruction (e.g., fadd A+B) loads a first operand (Aw) and a second operand (Bw) into the vector processing lane W 208d from the register 204 to be added together, and the 'Bw' operand is a denormal value, the Aw operand may be communicated to the dot product adder 208 through the multiplexer 220 to thereby bypass the vector processing lane W 208d (in this example, the 'Aw' operand is input into the dot product adder 208 through the input associated with vector processing lane Z 208c). The vector processing lane W 208d may prenormalize the 'Bw' operand and communicate the prenormalized 'Bw' operand to the dot product adder 208 through the input associated with the vector processing lane W 208d. The dot product adder 208 may perform a dot product operation on the Aw and prenormalized Bw operands to thereby perform the floating point addition operation of the floating point instruction.

Vector processing lanes X, Y, and Z 202a-c may be configured with logic similar to the multiplication 210, align 212, addition 214, rounding, and/or normalize logic 218 as shown in the example vector processing lane W 202d. Moreover, consistent with embodiments of the invention, one or more multiplexing logic 220 may be configured between one or more vector processing lanes 202a-d and the dot product adder 208.

Consistent with embodiments of the invention, when a denormal value is flagged, the operand is sent down the instruction pipeline to be prenormalized. Other operands may be diverted unchanged to the dot product adder 208. After prenormalization, the dot product adder 208 may perform a dot product operation with the prenormalized value and the other operands to produce the floating point result which may be stored in the register 204. In general, the dot product adder 208 may perform a dot product operation on received operands to generate equivalent results for particular types of floating point instructions. For example, the dot product adder may perform a floating point addition, and/or floating point subtraction (by changing a sign of an operand value).

In addition, a floating point multiplication addition (i.e., fmadd) may be performed using the multiplication logic 210 of a vector processing lane 202a-d and the dot product adder 208. In this example, if the floating point instruction is a floating point multiplication addition of Aw, Cw, Bw (i.e., fmadd(Aw, Cw, Bw)) which may be considered ((Aw*Cw+ Bw)), and Bw is a denormal value, the vector processing lane may perform the multiplication of Aw and Cw and communicate the floating point result of Aw*Cw to another input of the dot product adder 208 using the multiplexing logic 220. The vector processing lane may perform the prenormalization of Bw and communicate the prenormalized value to the dot product adder 208, and the floating point addition operation may be performed by the dot product adder 208 using the prenormalized value. As such, embodiments of the invention may multiplex operands to inputs of the dot product adder 208 such that the operands may be loaded into the dot product adder for processing.

Consistent with embodiments of the invention, the denormal value may be identified early in the instruction pipeline, such as at the aligner stage of a vector processing lane 202a-d. Moreover, since the vector execution unit 200 executes vector instructions (i.e., SIMD), while a first processing lane 202d may prenormalize a denormal value, other processing lanes 202a-c may concurrently perform the floating point operation of the instruction on loaded operands. Hence, in some embodiments of the invention, the first processing lane 202d defers performing the floating point operation to prenormalize the denormal value, but one or more other processing lanes 202a-c may perform the floating point operation on data loaded for the operands. The deferred floating point operation for the first processing lane 202d may then be performed by the dot product adder 208 with the prenormalized value.

It will be appreciated that implementation of the aforementioned functionality in vector execution unit 200 would be well within the abilities of one of ordinary skill in the art having the benefit of the instant disclosure. It will also be appreciated that the manner in which such functionality is implemented may differ in other embodiments of the invention. Therefore the invention is not limited to the particular embodiments illustrated herein.

Figure 5A:
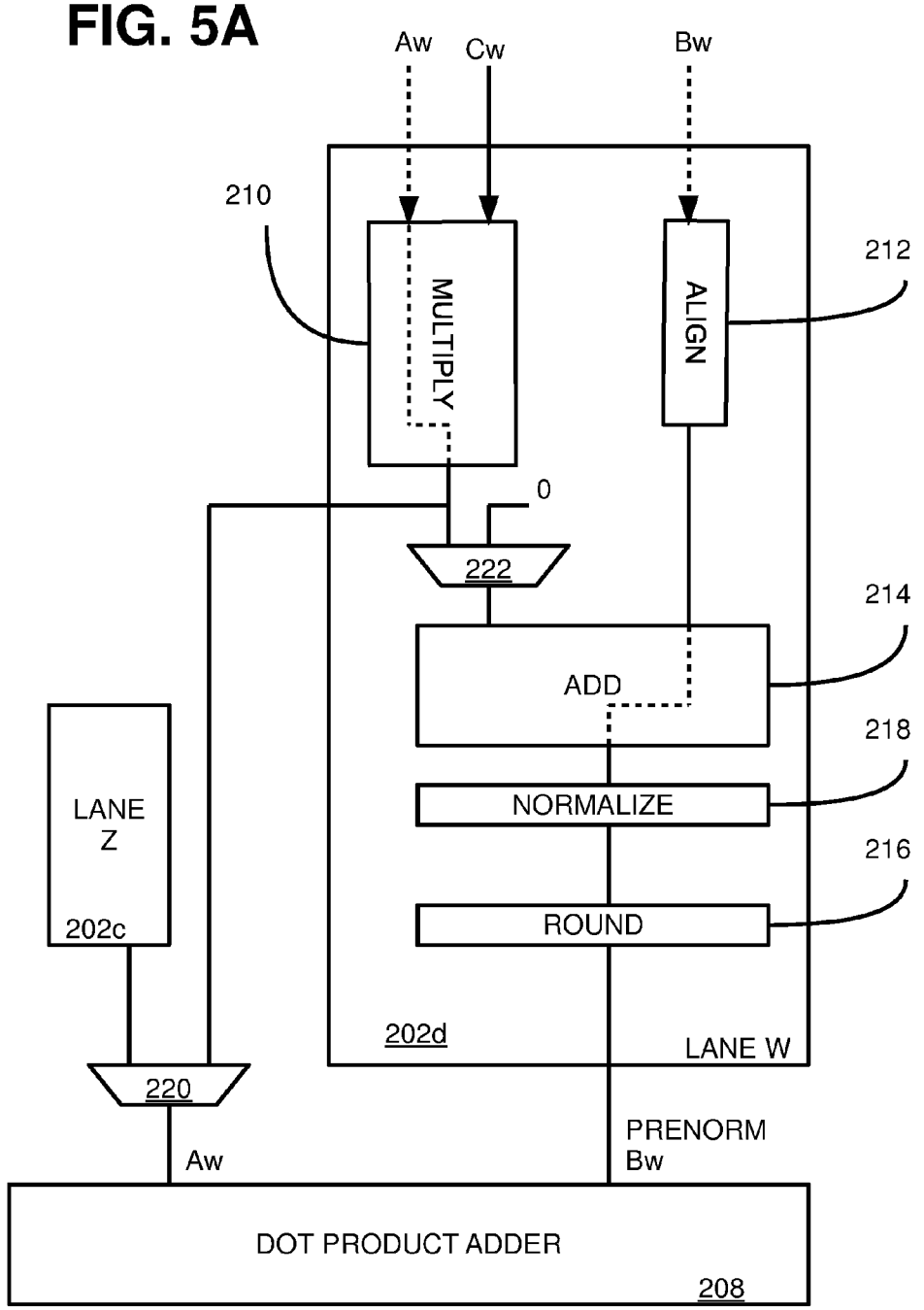
FIG. 5A is an example flow diagram of a processing lane of the vector execution unit of FIG. 5 when a denormal value is loaded into the processing lane.

FIG. 5A provides an example flow diagram when an operand that is a denormal value (illustrated as 'Bw') is loaded into a first processing lane 202d of the vector execution 200 unit of FIG. 5 for a floating point addition operation with a second operand (illustrated as 'Aw'). In this example, the denormal value operand, Bw, is input to the aligner logic 212. Bw may be identified as a denormal value at the aligner logic 212, and the aligner logic 212 may prenormalize Bw. As shown, the prenormalized Bw operand is communicated through the first processing lane 202d and into a first input of the dot product adder 208, where the first input corresponds to the first processing lane 202d. The second operand, Aw, is communicated through the multiplication logic 210 of the first processing lane 202d, and is output to a second input of the dot product adder 208, where the second input corresponds to a second processing lane 202c. Hence, Aw bypasses the first processing lane 202d through multiplexing logic 222 disposed in the first processing lane 202d, and Aw is communicated to the second input of the dot product adder 208 that corresponds to the second processing lane 202c through multiplexing logic 220 configured between the first processing lane 202d and the second processing lane 202c. While in FIG. 5A, the floating point operation is a floating point addition (i.e., fadd(Aw, Bw), as shown in FIG. 5A, a third operand Cw may be input into the first processing lane 202d. The third operand Cw may be utilized to perform a floating point multiplication addition (i.e., fmadd(Aw, Cw, Bw), where the floating point result of the floating point multiplication of Aw*Cw may be input to the second input of the dot product adder 208 using the multiplexing logic 222 configured in the first processing lane 202d and the multiplexing logic 220 configured between the first processing lane 202d and the second processing lane 202c.

Figure 6:
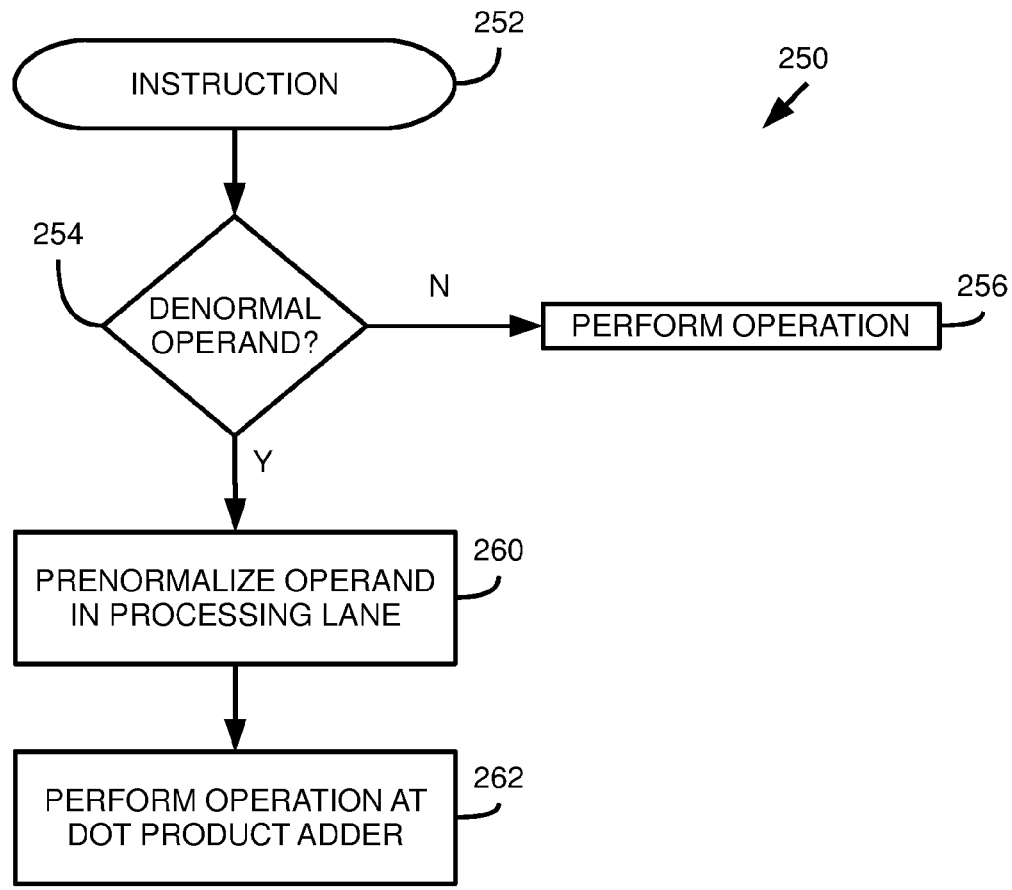
FIG. 6 is a flowchart illustrating a sequence of operations that may be performed by the vector execution unit of FIG. 5 to execute instructions.

Turning now to FIG. 6, this figure provides a flowchart 250 that illustrates a sequence of operations that may be performed by a processing unit including a vector execution unit consistent with embodiments of the invention to execute floating point instructions including at least one operand that is a denormal value. An instruction pipeline of the processor is monitored to detect instructions including an operand that is a denormal value (blocks 252-254). If an instruction does not include a denormal value operand ("N" branch of block 254), the floating point operation is performed in the vector processing lanes of the vector execution unit (block 256).

Responsive to detecting an instruction including an operand that is a denormal value ("Y" branch of block 254), the instruction may be flagged in the instruction pipeline. Flagging the instruction may include setting a register value corresponding to the instruction may be tracked in the instruction pipeline. A vector processing lane loaded with the denormal value operand prenormalizes the denormal value (block 260). The prenormalized operand and other operands of the instruction are communicated to a dot product adder of the vector execution unit, and the dot product adder performs at least a portion of the operation of the instruction on the prenormalized operand and the other operands (block 262). While not shown, for other processing lanes that do not include denormal operands, the floating point operation may still be performed in the respective processing lanes, even when one processing lane is used to prenormalize a denormal value.

FIG. 7 provides an example timing diagram 300 that illustrates processing cycles 302 (labeled cycle 1-cycle 34) of a processor when processing an instruction including a denormal value for an operand. As shown, the example instruction is a floating point addition ('A+B') 304, and the timing diagram 300 provides the operation being performed at each cycle of the processing unit. In this example, the processing unit identifies the denormal value at cycle 1, and initiates a flush of the instruction pipeline to execute microcode with an execution unit for processing denormal values at cycle 3 ('A+B' FLUSH TO UCODE FOR FIXUP'). A flush penalty of twenty processing cycles in incurred to flush the instruction pipeline, and at cycle 24, the processing unit begins execution of the microcode to normalize the denormal value. Normalization of the denormal value generally requires 6 processing cycles (cycles 24-29), and then the instruction may be executed with the normalized value (cycles 29-34). As illustrated by this example, the denormal value of an operand incurs processing cycle penalties that reduce the efficiency of the execution unit of the processing unit.

FIG. 8 provides an example timing diagram 350 that illustrates processing cycles 352 (labeled cycle 1-6) of a processing unit when processing an instruction including a denormal value for an operand consistent with embodiments of the invention. Similar to the timing diagram 300 of FIG. 7, the example instruction is a floating point addition ('A+B') 354, and the timing diagram 350 provides the operation being performed at each cycle of the processing unit. In this example, a vector execution unit of the processing unit identifies a denormal value for the 'B' operand of the instruction at cycle 1, and the vector execution unit prenormalizes the denormal value in cycles 2-5 in a vector processing lane of the vector execution unit. In cycles 6-9, a dot product adder of the execution unit performs a dot product operation that performs the floating point operation of the instruction ('A+B') with the prenormalized value for 'B'.

Therefore, embodiments of the invention may immediately prenormalize a denormal value of an operand of an instruction without flushing the instruction pipeline to execute microcode to normalize the denormal value. By prenormalizing the denormal value without flushing the instruction pipeline, performance penalties associated with processing denormal values in operands may be minimized or avoided, thereby improving the performance of processing units consistent with embodiments of the invention as compared to conventional processing units. Moreover, embodiments of the invention may often avoid reissuing an instruction, and hence may prenormalize the denormal value and perform the floating point operation in a single pass of the execution pipeline of the vector execution unit (i.e., a single issue of each instruction in the instruction pipeline for execution in the execution pipeline).

Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A circuit arrangement, comprising:
   a vector execution unit configured to execute a floating point instruction to perform a floating point operation using at least one operand identified by the instruction, wherein at least one operand of the floating point instruction is a denormal value, the vector execution unit comprising:
      a first processing lane comprising logic for performing floating point operations and configured to prenormalize the denormal value operand loaded in the first processing lane,
      a second processing lane comprising logic for performing floating point operations,
      a dot product adder including a first input that is connected to the first processing lane and a second input that is connected to the second processing lane, and the dot product adder is configured to perform at least a portion of the floating point operation using the prenormalized value,
      wherein the first processing lane is configured to communicate the prenormalized value through the logic of the first processing lane to the first input of the dot product adder, and the first processing lane prenormalizes the denormal value, communicates the prenormalized value through the logic to the first input of the dot product adder, and the dot product adder performs the at least a portion of the floating point operation in a single pass of an execution pipeline of the vector execution unit,
      wherein the floating point instruction includes the denormal value operand and a second operand,
      wherein the vector execution unit further comprises multiplexing logic connected between the first processing lane and the second input of the dot product adder, and the first processing lane is further configured to:
         load the denormal value operand and the second operand for processing,
         communicate the second operand to the second input of the dot product adder through the multiplexing logic such that the second operand bypasses the first processing lane, and
         communicate the prenormalized value to the first input of the dot product adder.

2. The circuit arrangement of claim 1, wherein the vector execution unit further comprises an instruction pipeline, and the vector execution unit is configured to monitor the instruction pipeline to detect a floating point instruction including a denormal value for an operand in the instruction pipeline and flag the detected floating point instruction in the instruction pipeline.

3. The circuit arrangement of claim 1, wherein the floating point instruction corresponds to a floating point addition operation.

4. The circuit arrangement of claim 1, wherein the floating point instruction corresponds to a floating point subtraction operation.

5. The circuit arrangement of claim 1, wherein the floating point instruction corresponds to a floating point multiplication addition operation.

6. The circuit arrangement of claim 1, wherein the first processing lane prenormalizes the denormal value and the dot product adder performs the floating point operation without reissuing the floating point instruction.

7. The circuit arrangement of claim 1, wherein the floating point instruction is a first floating point instruction, the floating point operation is a first floating point operation, and the first processing lane is further configured to perform a second floating point operation for a second floating point instruction that includes exclusively normal value operands.

8. An integrated circuit device comprising the circuit arrangement of claim 1.

9. A program product comprising a non-transitory computer readable medium and logic definition program code resident on the non-transitory computer readable medium and defining the circuit arrangement of claim 1.

10. A circuit arrangement, comprising:
    a vector execution unit configured to execute a floating point instruction to perform a floating point operation using at least one operand identified by the instruction, wherein at least one operand of the floating point instruction is a denormal value, the vector execution unit comprising:
       a first processing lane comprising logic for performing floating point operations and configured to prenormalize the denormal value operand loaded in the first processing lane,
       a second processing lane comprising logic for performing floating point operations,
       a dot product adder including a first input that is connected to the first processing lane and a second input that is connected to the second processing lane, and the dot product adder is configured to perform at least a portion of the floating point operation using the prenormalized value,
       wherein the first processing lane is configured to communicate the prenormalized value through the logic of the first processing lane to the first input of the dot product adder, and the first processing lane prenormalizes the denormal value, communicates the prenormalized value through the logic to the first input of the dot product adder, and the dot product adder performs the at least a portion of the floating point operation in a single pass of an execution pipeline of the vector execution unit,
       wherein the floating point instruction corresponds to a floating point multiplication addition operation wherein the floating point instruction includes the denormal value operand, a second operand, and a third operand,
       wherein the logic of the first processing lane includes floating point multiplication logic,
       wherein the vector execution unit further comprises multiplexing logic connected between the first processing lane and the second input of the dot product adder, and the first processing lane is further configured to:
          load the denormal value operand, the second operand, and the third operand for processing,
          perform a floating point multiplication operation with the second operand and the third operand to generate a floating point result with the floating point multiplication logic of the first processing lane, communicate the floating point result to the second input of the dot product adder through the multiplexing logic, and wherein the dot product adder performs the at least a portion of the floating point operation using the prenormalized value by performing an addition operation with the floating point result and the prenormalized value.

11. A circuit arrangement, comprising:

a vector execution unit configured to execute a floating point instruction to perform a floating point operation using a first operand and a second operand that are identified by the instruction, wherein the first operand of the floating point instruction is a denormal value, the vector execution unit comprising:

a first processing lane configured to prenormalize the denormal value operand loaded in the first processing lane, a second processing lane, a dot product adder comprising a first input and a second input, wherein the first processing lane is connected to the first input of the dot product adder, and the second processing lane is connected to the second input of the dot product adder, and multiplexing logic connected between the first processing lane and the second input of the dot product adder, wherein the first processing lane is further configured to load the second operand for processing, communicate the second operand to the second input of the dot product adder through the multiplexing logic such that the second operand bypasses the first processing lane, communicate the prenormalized value to the first input of the dot product adder, wherein the dot product adder is configured to perform at least a portion of the floating point operation with the prenormalized value and the second operand.

* * * * *